US012047356B2

(12) United States Patent
Aceto et al.

(10) Patent No.: US 12,047,356 B2
(45) Date of Patent: *Jul. 23, 2024

(54) NETWORK PROVISIONING AND TOKENIZATION USING A REMOTE TERMINAL

(71) Applicant: First Data Corporation, Brookfield, WI (US)

(72) Inventors: Nicholas Aceto, Wayne, PA (US); Kevin Nathan, Huntingdon Valley, PA (US); Kyle Nahrgang, Phoenixville, PA (US); Tom Catullo, King of Prussia, PA (US); Pete Foley, Reading, PA (US); Bill Miller, Bayville, NJ (US); Evan Broderick, Downingtown, PA (US)

(73) Assignee: FIRST DATA CORPORATION, Brookfield, WI (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/501,962

(22) Filed: Oct. 14, 2021

(65) Prior Publication Data
US 2022/0038439 A1 Feb. 3, 2022

Related U.S. Application Data

(63) Continuation of application No. 16/379,566, filed on Apr. 9, 2019, now Pat. No. 11,178,118.

(51) Int. Cl.
*H04L 29/06* (2006.01)
*G06F 21/60* (2013.01)
(Continued)

(52) U.S. Cl.
CPC ........ *H04L 63/0428* (2013.01); *G06F 21/602* (2013.01); *G06Q 20/027* (2013.01);
(Continued)

(58) Field of Classification Search
CPC . H04L 63/0428; H04L 9/0869; H04L 9/3213; G06F 21/602; G06Q 20/027; G06Q 20/3829
See application file for complete search history.

(56) References Cited

U.S. PATENT DOCUMENTS 11,409,948 B2 * 8/2022 Al-Sallami ........... G06F 3/0484
11,593,773 B1 * 2/2023 Yip ..................... G06Q 20/4015
(Continued)

FOREIGN PATENT DOCUMENTS

WO WO 2015/095599 A1 * 6/2015 ............. G06Q 20/32

OTHER PUBLICATIONS

International Search Report and Written Opinion mailed Jun. 30, 2020 in related application No. PCT/US2020/026397, all pgs.
(Continued)

*Primary Examiner* — Joseph P Hirl
*Assistant Examiner* — Chi D Nguy
(74) *Attorney, Agent, or Firm* — FOLEY & LARDNER LLP

(57) ABSTRACT

A method of tokenizing sensitive data from a terminal device includes receiving, a connection request comprising a hardware serial number associated with a terminal device and validating the hardware serial number associated with the terminal device. The method includes sending a command to a terminal device that causes the terminal device to display a prompt for sensitive data associated with a user interacting with the terminal device and receiving an encrypted data packet from the terminal device. The encrypted data packet includes the sensitive data. The method includes sending the encrypted data packet to a gateway system for tokenization, receiving a token that represents the sensitive data, and providing the token to the terminal device.

20 Claims, 6 Drawing Sheets

(51) Int. Cl.
  *G06Q 20/02*    (2012.01)
  *G06Q 20/38*    (2012.01)
  *H04L 9/08*     (2006.01)
  *H04L 9/32*     (2006.01)
  *H04L 9/40*     (2022.01)

(52) U.S. Cl.
  CPC ....... *G06Q 20/3829* (2013.01); *H04L 9/0869* (2013.01); *H04L 9/3213* (2013.01); *G06Q 2220/00* (2013.01); *H04L 2209/56* (2013.01)

(56) References Cited

U.S. PATENT DOCUMENTS

| | | | |
|---|---|---|---|
| 2005/0154674 A1* | 7/2005 | Nicholls | G06Q 40/04 |
| | | | 705/43 |
| 2012/0304273 A1 | 11/2012 | Bailey et al. | |
| 2014/0282971 A1 | 9/2014 | Gustavson et al. | |
| 2016/0014253 A1 | 1/2016 | Holtmanns et al. | |
| 2016/0117162 A1 | 4/2016 | Searle et al. | |
| 2016/0148197 A1 | 5/2016 | Dimmick | |
| 2016/0241891 A1 | 8/2016 | Ninomiya et al. | |
| 2016/0294556 A1* | 10/2016 | Vortriede | H04L 9/321 |
| 2016/0328707 A1 | 11/2016 | Wagner et al. | |
| 2017/0068955 A1* | 3/2017 | Agarwal | G06Q 20/3265 |
| 2017/0076265 A1 | 3/2017 | Royyuru et al. | |
| 2017/0300897 A1 | 10/2017 | Ferenczi et al. | |
| 2017/0344981 A1 | 11/2017 | Jain | |
| 2018/0083936 A1 | 3/2018 | Johnson et al. | |
| 2019/0005480 A1* | 1/2019 | Jung | G06F 21/629 |
| 2019/0042228 A1* | 2/2019 | Nolan | G06F 8/64 |
| 2019/0266605 A1* | 8/2019 | Plomske | G06Q 20/38215 |
| 2019/0318345 A1 | 10/2019 | Kallugudde | |
| 2019/0385159 A1 | 12/2019 | Beatty et al. | |
| 2020/0034832 A1 | 1/2020 | Korpal et al. | |

OTHER PUBLICATIONS

Extended European Search Report dated Feb. 9, 2022 issued from European Patent Application No. 20787546.9, 7 pages.

* cited by examiner

NETWORK PROVISIONING AND TOKENIZATION USING A REMOTE TERMINAL

CROSS REFERENCE TO RELATED APPLICATIONS

This application is a Continuation of U.S. application Ser. No. 16/379,566, filed Apr. 9, 2019, the entirety of which is incorporated herein by reference.

BACKGROUND OF THE INVENTION

Currently, when integrating new terminal devices to a networked system a user must understand the programming code and specifications (which are often produced independently of the other devices of the networked system) of the terminal device and specifically develop a platform that can integrate the software and hardware of the terminal device into the existing network infrastructure, essentially requiring the user to develop code for each type of terminal device within the network from scratch. Such solutions are not only complicated, but also involve significant costs and time to implement, especially in applications that are desired to be operable with a large variety of terminal devices.

BRIEF SUMMARY OF THE INVENTION

Embodiments of the present invention are directed to systems for managing sensitive data. In particular, embodiments are directed to systems and methods for enhancing the secure handling of sensitive data by using tokenization, thereby eliminating the need to the sensitive data to be stored on multiple devices across a network. Rather, only a single entity needs to store the sensitive data and associate with a token, while the remainder of the networked devices can utilize the token to convey the sensitive data.

In one embodiment, a method of tokenizing sensitive data from a terminal device is provided. The method may include receiving, at a tokenization system, a connection request comprising a hardware serial number associated with a terminal device and validating, by the tokenization system, the hardware serial number associated with the terminal device. The method may also include sending, by the tokenization system, a command to a terminal device that causes the terminal device to display a prompt for sensitive data associated with a user interacting with the terminal device and receiving, by the tokenization system, an encrypted data packet from the terminal device. The encrypted data packet may include the sensitive data. The method may further include sending, by the tokenization system, the encrypted data packet to a gateway system for tokenization and receiving, from the gateway system, a token that represents the sensitive data. The method may include providing, by the tokenization system, the token to the terminal device.

In another embodiment, a method of provisioning a terminal device for use with a tokenization system is provided. The method may include registering, at a first time, a terminal device by sending a hardware serial number associated with the terminal device to a terminal management system for storage thereon. The method may also include receiving, by the tokenization system at a second time, the hardware serial number associated with the terminal device, a connect command, and an authentication key from the terminal device. The method may further include querying a terminal management system for a stored hardware serial number associated with the terminal device and verifying that the hardware serial number from the remote device matches the stored hardware serial number from the terminal management system. The method may include validating the authentication key and verifying that the remote device is currently enabled. The method may also include authenticating the remote device based on the authentication key and querying the terminal management system for hardware information associated with the terminal device. The method may further include receiving the hardware information associated with the terminal device from the terminal management system and remotely enabling functionality of the terminal device based on the hardware information associated with the terminal device.

In another embodiment, a system for tokenizing sensitive data from a terminal device is provided. The system may include a tokenization system that is configured to receive a connection request comprising a hardware serial number associated with a terminal device and validate the hardware serial number associated with the terminal device. The tokenization system may also be configured to send a command to a terminal device that causes the terminal device to display a prompt for sensitive data associated with a user interacting with the terminal device and receive an encrypted data packet from the terminal device, the encrypted data packet comprising the sensitive data. The tokenization system may be further configured to send the encrypted data packet to a gateway system. The system may also include a tokenization gateway that is configured to receive the encrypted data packet from the tokenization system and decrypt the encrypted data packet. The tokenization gateway may also be configured to generate a token based on at least of portion of data present in the data packet and transmit the token to the tokenization system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
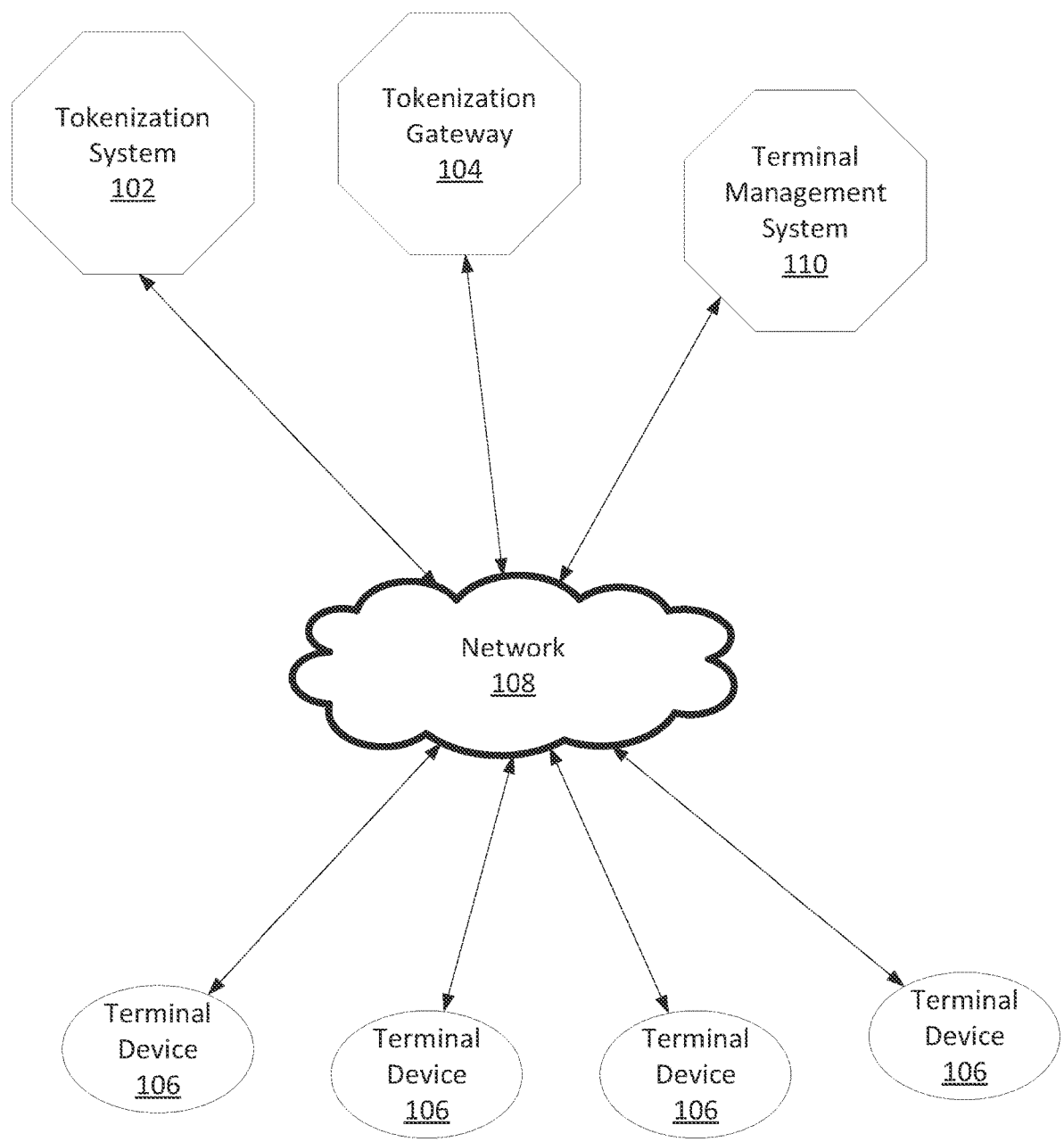
FIG. 1 illustrates a system for tokenizing sensitive data according to embodiments.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to tokenization systems and methods that are used to protect sensitive data that is transmitted between networked devices. For example, sensitive data may be sent to a tokenization gateway that generates a token based on the sensitive data. The tokenization gateway may store the sensitive data along with the token, while providing the token to other devices within the network, such that the sensitive data is not propagated throughout the network. This makes it significantly less likely that the sensitive data may be compromised due to a single one of the networked devices being hacked or otherwise accessed by unauthorized personnel.

Embodiments of the present invention are also directed to the provisioning of terminal devices for use with a tokenization system over a network. The terminal devices may be provisioned and registered for use with the tokenization system. For example, one particular embodiment enables commercial, third party off the shelf terminal devices (such as tablets, e-readers, mobile phones, personal computers, etc.) to accept payment without having a credit card reader and/or other payment reader built in. Instead, such reader devices may be tethered to the commercial off the shelf hardware using USB and/or other wired and/or wireless interface(s). To enable integration of the third-party terminal devices with the tokenization system, a custom terminal application is created that is executable by the existing hardware of the terminal device. Simple application programming interfaces (API), such as a Restful JavaScript Object Notation (JSON) API, are developed that allow the terminal application to interact with the tokenization system. During the provisioning process, a user of each terminal device may request particular functionality (such as magnetic stripe functionality, NFC functionality, etc.) and the terminal application may be interfaced with the proper APIs to enable such functionality while operating with the tokenization system.

Such procedures eliminate the need to directly integrate software of the third party device to the tokenization system by coding a full connection program that is unique to each device. Instead, the terminal application serves as a middleware application that allows for easy integration of each different third party device with the tokenization system using the APIs that are developed for the various data transfers between the terminal devices and tokenization system. Specifically, the provisioning of each terminal device now involves only integrating the existing software of the terminal device to interface with the newly developed APIs, which are pre-configured to communicate with the tokenization device. This results in a much more efficient provisioning process, as rather than programming an entire interface between each unique terminal device and that tokenization system (including translation algorithms to handle various input and output formats) from scratch, a user must install the terminal application onto the terminal device and set up the connections between the outputs and inputs of the terminal device and the inputs and outputs of the API. For example, the API includes a very simple set of commands that a user can interact with using the terminal application. Additionally, during provisioning, each of the terminal devices may be pre-certified for EMV such that the terminal devices may accept EMV and may be updated with new features to ensure proper security and connectivity standards may be maintained with all existing devices. For example, updates may be sent to each terminal device to update the firmware, update the user properties, push out new features down to each terminal device.

Turning now to FIG. 1, a system 100 for tokenizing sensitive data is illustrated. System 100 may include a tokenization system 102 that is configured to interface with any number of terminal devices 106 via one or more APIs that are designed to provide a simple connection between each terminal device 106 and the tokenization system 102. The tokenization system 102 may then receive sensitive data (such as data that identifies a user, an account, and/or other data that warrants very secure handling) from a terminal device 106, pass the data to a tokenization gateway 104, which then tokenizes the sensitive data and passes the resultant token back to the tokenization system 102. The tokenization system 102 may then pass the token back to the terminal device 106. Oftentimes the sensitive data transmitted to the tokenization system 102 and forwarded to the tokenization gateway 104 is encrypted by the terminal device 106. In such embodiments, the tokenization gateway 104 may decrypt the encrypted data packet prior to generating the token based on at least of portion of sensitive data.

In a particular application, the sensitive data may be data related to a payment account, such as a primary account number, personal identification number, and/or other information that identifies a payment account. This information may be collected at a terminal device 106 acting as a point of sale (POS) device, such as by using a payment reader (magnetic stripe reader, keypad, NFC reader, barcode scanner, etc.) and sent to the tokenization system 102. The tokenization system 102 may then pass the payment information to the tokenization gateway 104, which may tokenize the payment information. The tokenization gateway 104 may store the token in association with the payment information and return the token to the tokenization system 102 for subsequent transmission to the terminal device 106. In such a manner, the merchant associated with the terminal device 106 may store the token, rather than the payment account identifier itself, thereby making the merchant's systems more secure and ensure that if hacked, less sensitive information is compromised than if the merchant stored the account numbers themselves.

System 100 may include any number of terminal devices 106. Terminal devices 106 may be any device that is configured to connect with the tokenization system 102 and/or tokenization gateway 104 over one or more networks 108. Terminal devices 106 may include personal computers, tablet computers, mobile phones, e-readers, and/or other network-enabled computing devices. In some embodiments, the terminal devices 106 may be configured to receive inputs related to sensitive data, such as payment account information. For example, the terminal devices 106 may include one or more payment readers, such as magnetic stripe readers, barcode readers, near field communication (NFC) readers, and/or other contact/contactless media readers. In some embodiments, some or all of the terminal devices 106 may not include integrated payments readers (or a specific kind of payment reader). In such embodiments, the terminal devices 106 may be interfaced with one or more separate payment readers, such as standalone magnetic stripe readers, NFC readers, barcode scanners, and/or other payment readers. For example, the standalone devices may be interfaced with a terminal device 106 using a wired connection (i.e.

universal serial bus (USB), Ethernet, USB-C, lightning cable, and/or other wired connection) and/or using a wireless connection.

Each terminal device 106 needs to be provisioned to work with the tokenization system 102 and tokenization gateway 104. The terminal devices 106 may also need to be updated periodically to maintain operability with the tokenization system 102 and tokenization gateway 104. A terminal management system 110 may be used to provision each of the terminal devices 106 and to help ensure that the terminal devices 106 remain up-to-date and/or desired functionality is enabled. For example, to provision each of the terminal devices 106, the terminal management system 110 may register a particular terminal device 106 by making a record of an identifier of the terminal device 106 (such as a hardware serial number (HSN) and/or other identifier that is unique to a particular terminal device 106). The terminal management system 110 may also maintain a record of hardware types and capabilities associated with each terminal device 106 so that each terminal device 106 may have the proper functionality enabled for use with the tokenization system 102 and tokenization gateway 104.

In some embodiments, as part of the provisioning process the terminal management system 110 may also generate a unique authentication key for each terminal device 106. For example, an alphanumeric key, such as a 32 bit (or other size) authentication key may be randomly generated by the terminal management system 110. This authentication key may be stored, with a copy being sent to the terminal device 106, which may later pass the key to the tokenization system 102. The tokenization system 102 can then validate the key by requesting the key from the terminal management system 110 and comparing the two keys.

Once the terminal device 106 is registered with the terminal managing system 110, the terminal management system 110 may have the ability to remotely send commands to the terminal device 106 (directly, or indirectly via the tokenization system 102) that enable/disable the ability of the terminal device 106 to operate with the tokenization system 102 and/or tokenization gateway. The terminal management system 110 may also have the ability to remotely send commands that enable and/or disable all or a portion of the functionality of the terminal device 106. For example, a user of the terminal device 106 may want to enable NFC functionality of the terminal device 106 for use with the tokenization system 102. The terminal device 106 may communicate a request for NFC functionality to the terminal management system 110, which may issue a command to the terminal device 106 and/or the tokenization system 102 to enable the desired functionality of the terminal device 106 with the tokenization system 102.

The terminal management system 110 may also be used to update functionality of the terminal devices 106. For example, a user may want to start accepting data using a magnetic stripe reader that was not previously connected to the terminal device. A request may be sent from the terminal device 106 (or another device that is configured to interfaced with the network including the tokenization system 102, terminal management system 110, and/or tokenization gateway 104) to enable the magnetic stripe functionality. In embodiments where the new functionality is being facilitated by new hardware, an identifier of the hardware and/or technical specifications of the new hardware may be included with the request. Based on receiving the request, the terminal management system 110 (directly and/or indirectly, such as via the tokenization system 102) may send out a flag or other command to the terminal to enable the magnetic reader capabilities for use with the tokenization system 102.

The terminal management system 110 may also ensure that the proper software is being run at all times, and may also be used to push any other software updates (functional and/or stylistic) to the terminal device 106 as needed. For example, the terminal management system 110 may return checks on what should be running on the terminal device 106 by sending a file check command down to the terminal device 106. The terminal device 106 the return an indication of what firmware and/or version of firmware the terminal device 106 is running as well as a check sum of the software. The terminal management system 110 may compare these values to expected values to ensure the proper software is being run.

Similarly, the terminal management system 110 may execute an image check to ensure that a boot up image, idle image, and/or other image that is displayed on the terminal are up to date such that if a new version of one of those image types has been added to the terminal management system 110 for a particular user/terminal device 106 then the updated image may be sent to the terminal device 106. The terminal management system may also execute any necessary style property updates. For example, updates to the header, the banner, background color, foreground color, font, and/or other stylistic elements may be sent from the terminal management system 110 to the various terminal devices 106.

In some embodiments, some or all of the software/style checks and/or updates may be done each time a terminal connects to the tokenization system 102 and/or terminal management system 110. Additionally or alternatively, the updates and/or checks may be performed at scheduled intervals, such as once every 24 hours. In such embodiments, the tokenization system 102 and/or terminal management system 110 perform a rolling disconnect and reconnect of the connected terminal devices 106 in which each terminal device 106 may be assessed and updated if needed. In some embodiments, the rolling disconnect and reconnect may be done in small batches of terminal devices 106 (such as dozens or 100 devices at once) to avoid overloading the servers. In some embodiments, the timing of these update and/or check periods may be set by the end user to ensure that the terminal devices 106 are not in use at the time of the updates to prevent any service interruptions.

Oftentimes, after each terminal device 106 is provisioned, the terminal management system 110 may not be in direct communication with the terminal devices 106. Rather, the terminal management system 110 may be used by the tokenization system 102 as a sort of database containing rules and software for each terminal device 106. The tokenization system 102 may communicate directly with the terminal device 106, including querying the terminal device 106 for any hardware, firmware, and/or software versions, and may then access the terminal management system 110 to determine whether any updates or other changes are needed. If needed, the tokenization system 102 may retrieve the updates from the terminal management system 110 and pass them on to the relevant terminal device 106.

Network 108 may be a local area network (LAN) and/or other private or public wired and/or wireless networks. Network 108 may utilize one or more of Wi-Fi, ZigBee, Bluetooth™ Bluetooth™ Low Energy, a cellular communications protocol such as 3G, 4G, or LTE, and/or any other wireless communications protocol. Network 108 may be communicatively coupled with one or more of the components of the system to facilitate communication between the various components. It will be appreciated that one or more different network connections may be used in accordance with the invention, and that the use of a single network 108 to enable communications is merely one example of such configurations. For example, each component may be communicatively coupled with other components using a separate network for one or more of the connections. Oftentimes, data sent over network 108 is encrypted, such as using hashing, symmetric key techniques, and/or asymmetric key pairs, to ensure the data remains secure while being transmitted over network 108. This is particularly true for the terminal devices 106 as they transmit the sensitive data to the tokenization system 102, as well as when the tokenization system transmits the sensitive data to the tokenization gateway. Additionally, or alternatively, the connections between the various devices and systems may be done using a secure sockets layer to further secure the connections.

While described above as a system of distinct devices, it will be appreciated that in some embodiments the functionality of some of the components may be combined into a single device or system. For example, the tokenization system 110, terminal management system 110, and/or tokenization gateway 104 may be combined into a single specialized computing device, while in other embodiments each device may be separate from the others. IN some embodiments, a single entity may control each of the tokenization system 110, terminal management system 110, and/or tokenization gateway 104, while in other embodiments, different entities may control different systems. For example, a first entity may operate the tokenization system 102 while a different second entity may operate the tokenization gateway 104. In some embodiments, the tokenization system 110, terminal management system 110, and/or tokenization gateway 104 may be operated as dedicated servers, such as tokenization and/or secure socket servers that provide the tokenization and/or other security functionality to the system to tokenizing sensitive data.

Figure 2A:
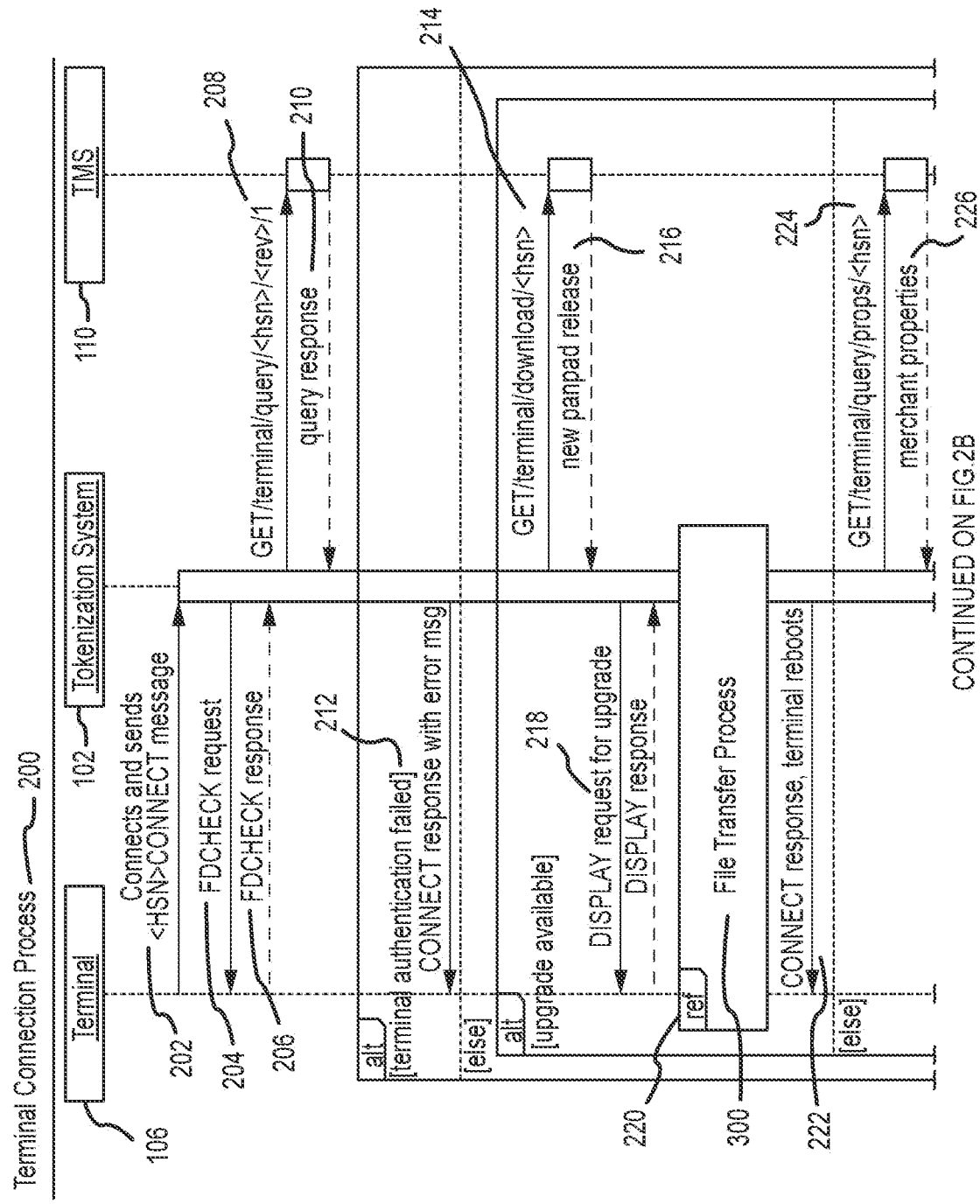
FIGS. 2A and 2B depict a swim lane diagram of a terminal connection procedure according to embodiments.
Figure 2B:
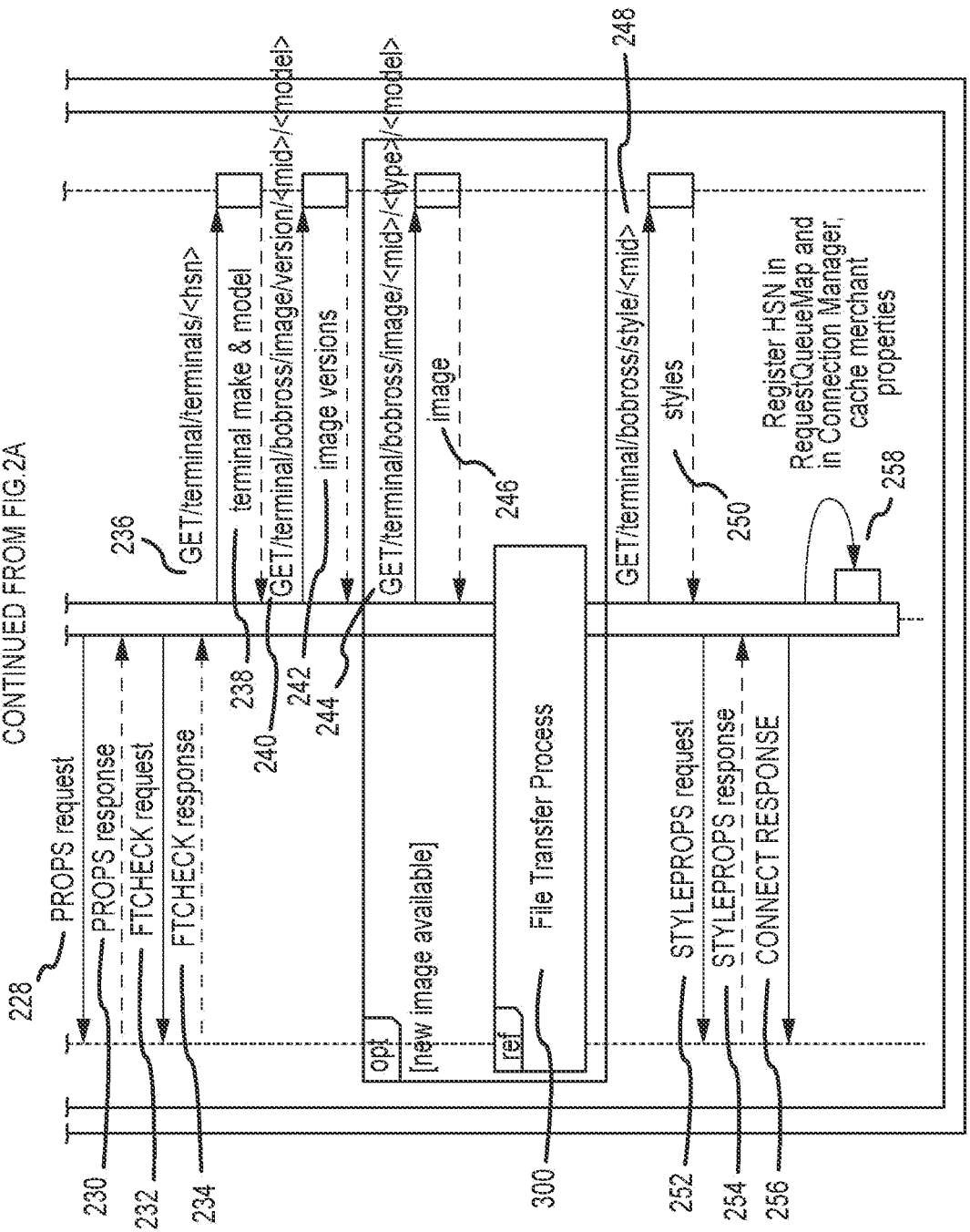

FIGS. 2A and 2B depict a terminal connection procedure 200 according to embodiments of the invention. This procedure 200 may be done as part of a provisioning process for a terminal device 106 and/or each time the terminal device 106 connects to a tokenization system 102 (which may be as part of a sensitive data transfer and/or a standard rolling disconnect and reconnect process for connected terminal devices 106). To begin the procedure, the terminal device 106 may send a connection request 202 to the tokenization system 102. The connection of the terminal device 106 is to a specific port of the tokenization system 102. In some embodiments, this may involve the terminal device 106 connecting to a pubic 443 port of the tokenization system 102. As noted above, as each terminal device 106 is provisioned in terminal management system 110, a unique randomly generated authentication key is generated and sent out to the terminal device 106 for storage on the terminal device 106. The connect request 202 may include the authentication key along with a hardware serial number and/or other identifier of the terminal device 106.

In some embodiments, each terminal device 106 may utilize a secure shell on them which they use to connect over transport layer security (TLS) to the tokenization system 102. Each terminal device 106 may include a secure shell certificate. The certificate may be authenticated by the tokenization system 102 to manage the connection by only allowing connections from terminal devices 106 having valid certificates.

In response to the request 202, the tokenization system 102 may issue a file check command 204 to the terminal device 206, which queries the terminal device 106 for what firmware is currently running (possibly including version details) as well as a check sum of any software running on the terminal device 106. The terminal device 106 then returns a file check response 206 that includes the requested data. The tokenization system 102 may then submit a query 208 to the terminal management system 110 for a match for the hardware serial number of the terminal device 106. The terminal management system 110 then returns a response 210 that includes the hardware serial number, expected firmware version, a check sum for the software expected to be running on the terminal device 106. The tokenization system 102 then compares the information received from the terminal management system 110 with the data received from the terminal device 106. For example, the tokenization system 102 verifies that the hardware serial number (or other identifier of the terminal device 106) is known, that the terminal device 106 is enabled and hasn't been disabled, and may authenticate the terminal device 106 using its authentication key.

If the authentication fails for any reason, an error message 212 may be communicated to the terminal device 106. If the terminal device 106 passes authentication, the tokenization system 102 may perform checks to ensure the proper software and system properties are being executed on the terminal device 106. The tokenization system 102 sends a query 214 to the terminal management system 110 to check whether a software update is available for the terminal device 106. If a new version of software is available, the terminal management system 110 transmits a copy of the new version of the software to the tokenization system 102. The tokenization system 102 sends a prompt 218 to accept the software upgrade to the terminal device 106, which may return a response 220 (which may be based on the terminal device 106 being out of use to ensure service is uninterrupted) that accepts the software upgrade. The new version of software is then downloaded onto the terminal device using a file transfer press 300, which will be described in greater detail in relation to FIG. 3 below. Upon the completion of the file transfer process 300, the tokenization system 102 may communicate a reboot command 222 to the terminal device 106 that causes the terminal device 106 to restart to complete the software update process.

After any software upgrades (and any necessary reboots) are completed, the tokenization system 102 may ensure that the operating properties of the terminal device 106 are properly set up and up to date. Operating properties may include various hardware functionality (magnetic stripe readers, NFC readers, etc.) and/or other operating characteristics of the terminal device 106. The tokenization system 102 sends a query 224 for the set of operating properties that should be running on the terminal device 106 to the terminal management system 110, which may return a list of property settings 226 that should be running for that particular terminal device 106. The tokenization system 102 sends a prompt 228 to confirm whether it is available for a properties check and that terminal device 106 may return a response 230 indicating the status of the terminal device 106. If the terminal device 106 is in an available state, the tokenization system 102 may transmit an addition file check command 232 to the terminal device 106, which may return a file check response 234 that indicates a version of the properties currently running on the terminal device 106. If the properties don't match, then the tokenization system 102 may instruct the terminal device 106 to update the properties to the correct settings.

The tokenization system 102 may then send a query 236 to the terminal management system 110 to determine hardware properties for the terminal device 106, with the terminal management system 110 returning a make and model 238 of the terminal device 106, as well as any other information that is relevant to hardware properties. The tokenization system 102 then submits a query 240 to check for new images for the terminal device 106, such as boot up images, idle images, and/or other user interface parameters such as changes to the header, banner, background color, foreground color, font properties, and the like. Information 242 related to current versions of images are then sent to the tokenization system 102 from the terminal management system 110 such that the tokenization system 102 can determine whether any of the current versions are not being used by the terminal device 106 (such information may be returned as part of the file check response 234 and/or a new file check procedure). If one of the new image versions constitutes a new image, the tokenization set 102 may submit a request 244 to the terminal management system 110 for new images. The new image files 246 may be sent to the tokenization system 102, which may download the images to the terminal device 106 using file transfer press 300.

Similar checks may be run for any other stylistic properties of the terminal device 106. For example, the tokenization system 102 may submit a query 248 to the terminal management system 110 for any other stylistic property settings, with a response 250 being provided by the terminal management system 110. A query 252 for the current style properties being executed by the terminal device 106 may be sent, and a response with the current properties 254 may be returned. If changes are necessary, the tokenization system 102 may instruct the terminal device 106 to change the settings accordingly. Once any updates are completed, the tokenization system 102 may send a connect response 256 that terminates the connection between the terminal device 106 and the tokenization system 102. The tokenization system 102 may then reregister the hardware serial number and current properties of the terminal device 106.

Figure 3:
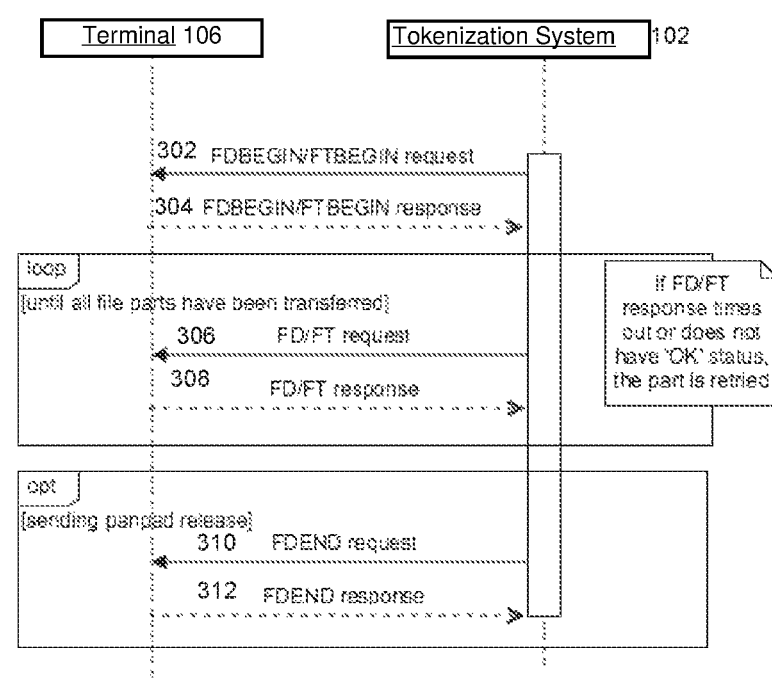
FIG. 3 illustrates a file transfer process according to embodiments.

FIG. 3 depicts a file writing procedure 300 according to embodiments of the invention. File writing procedure 300 may be used to transfer any data from the tokenization system 102 to the terminal device 106, such as images, device settings, software/firmware updates, and the like. A file transfer request 302 is transmitted from the tokenization system 102 to the terminal device 106. A response 304 is returned, and if positive, the file transfer may comment. A loop is initiated by the tokenization system 102 that involves a file download command 306 being sent to the terminal device 106. Each file download command 306 includes a header that indicates which portion of a completed download file that the particular file download command 306 is, as each download file is transferred to the terminal device 106 as N smaller parts (often times in 1 kb-10 kb chunks, although other file sizes may be used). For each file download command 306 that is successfully received by that terminal device 106, the terminal device 106 may return a file download response 308 that indicates the file download command 306 was received properly. If any of the file download commands 306 and/or file download responses 308 are not completed (or not completed before a timeout period has elapsed) then the relevant may be retried. If failure continues, the process may be terminated and/or reinitiated, with the successfully transmitted file download commands 306 and/or file download responses 308 being purged and/or saved for the subsequent attempt. At the end of the loop, a final command 310 may be sent from the tokenization system 102 to the terminal device 106 that instructs the terminal device 106 that the final file download command has been sent, with the final command including a check sum. The terminal device 106 then assembles all the file download commands 306 a single file and validates the check sum to ensure the terminal device 106 received all the intended file chunks. A response 312 indicating a result of the validation may then be sent to the tokenization system 102.

Figure 4:
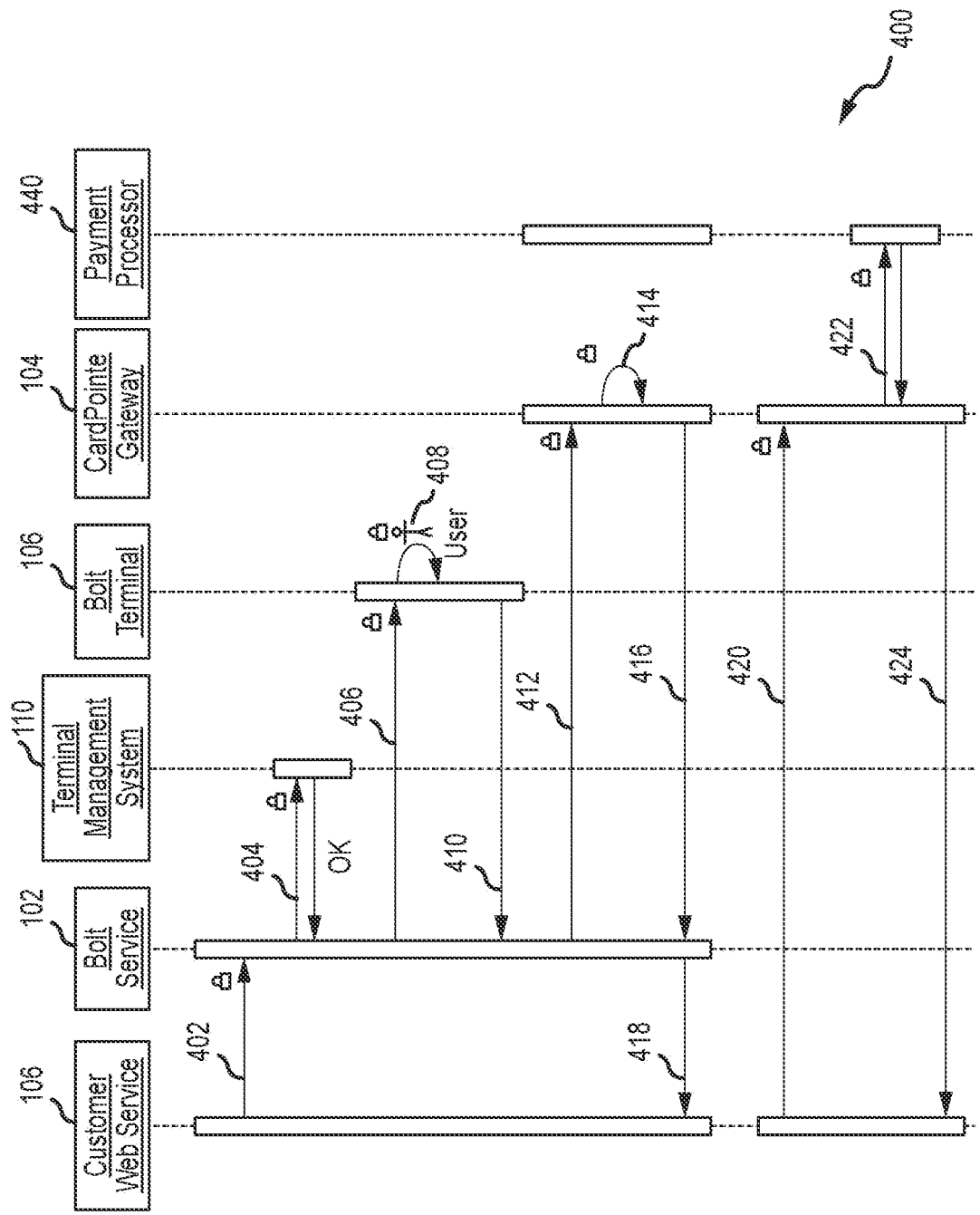
FIG. 4 is a swim lane diagram of a procedure for tokenizing sensitive data according to embodiments.

FIG. 4 depicts a tokenization procedure 400 according to embodiments. At 402, terminal device 106 (and/or another device acting on behalf of the terminal device 106) sends a connection request, such as using a Rest call though the API of the tokenization system 102. The connection request 402 may include the hardware serial number, the authentication key, and/or secure shell connection certificate of the terminal device 106. The tokenization set 102 then validates the terminal device 106 at 404 by comparing the hardware serial number, the authentication key, and/or secure shell connection certificate of the terminal device 106 with corresponding data retrieved from the terminal management system 110, such as described in the terminal connection procedure 200. At 406 the tokenization system 102 may send a prompt to the terminal device 106 to request sensitive data, such as payment information and/or a PIN. A user of the terminal device 106 may input the sensitive data to the terminal device 106 at 408 using an input device of the terminal device 106 and/or an external input device that is coupled with the terminal device 106. Input devices may include magnetic stripe readers, NFC readers, barcodes scanners, keypads, touchscreens, and/or other input mechanisms. For example, the user at the terminal device 106 may be prompted to confirm an amount, swipe their payment media, and enter a PIN when necessary. The terminal device 106 may encrypt the sensitive data using an encryption key provided to the terminal device 106 during the provisioning process, and may then transmit the encrypted data to the tokenization system 102 at 410. The tokenization system 102 may then pass the encrypted data to the tokenization gateway 104 at 412. The tokenization gateway 104 may then decrypt the encrypted sensitive data using its own key and then may generate a token based on the sensitive data at 414. The tokenization gateway 104 may store the token along with the sensitive data and may transit the token back to the tokenization system 102 at 416. The tokenization system 102 then passes the token to the terminal device at 418. In payment applications, an authentication request that includes the token is then communicated to a payment processor 440 at 420. The payment processor uses the token to access the sensitive data to authenticate the payment at 422 and sends an authentication result back to the terminal device 106 at 424.

It will be appreciated that the above processes are merely provided as example processes and other variations may be practiced in accordance with the present invention. Moreover, several of the processes described herein may be performed as a single, larger process and/or may be broken up into smaller processes.

Figure 5:
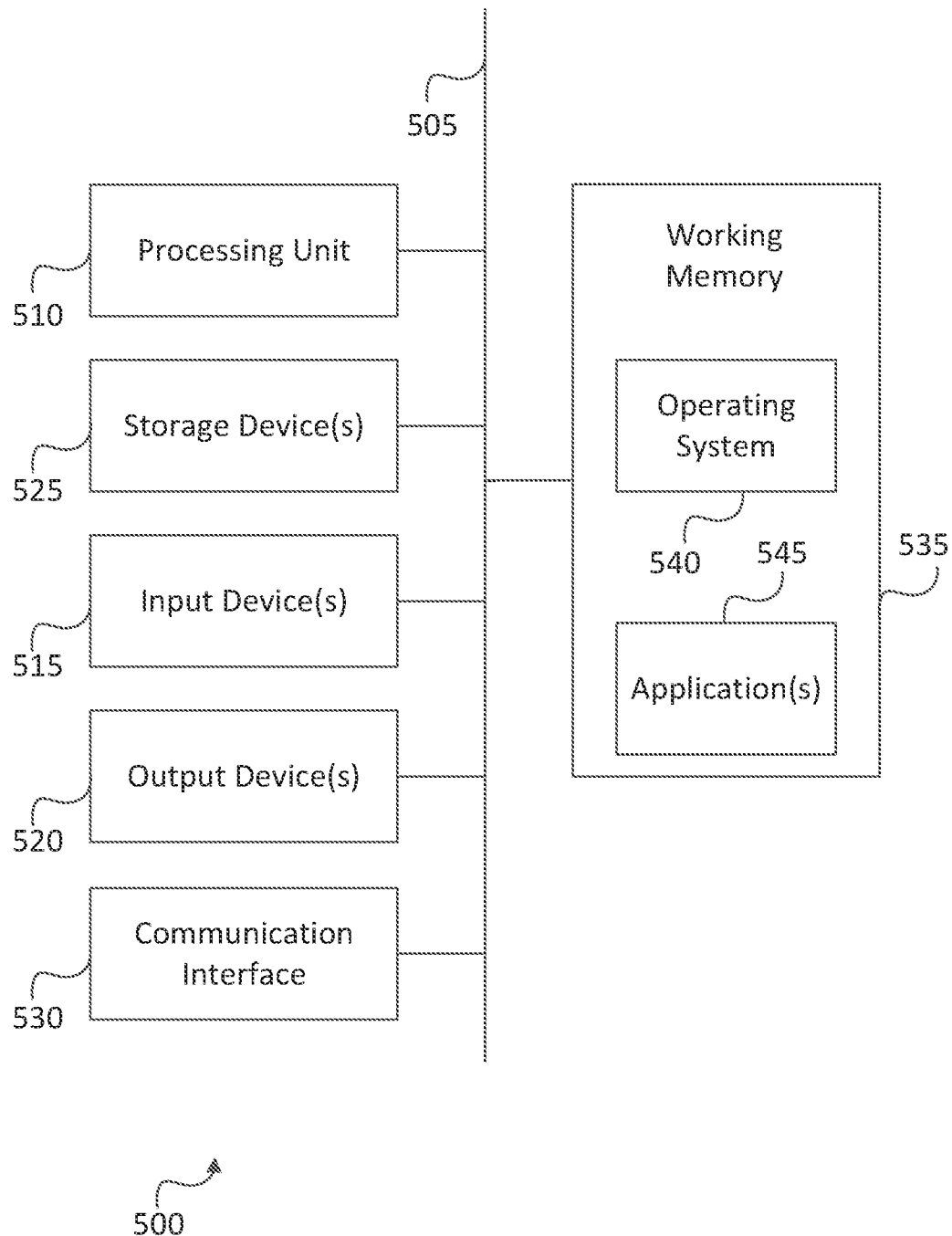
FIG. 5 is a block diagram of a computing system according to embodiments.

A computer system as illustrated in FIG. 5 may be incorporated as part of the previously described computerized devices. For example, computer system 500 can represent some of the components of the terminal device 106, tokenization system 102, tokenization gateway 104, terminal management system 110, payment process 440, and the like described herein. FIG. 5 provides a schematic illustration of one embodiment of a computer system 500 that can perform the methods provided by various other embodiments, as described herein. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more processors, such as one or more special-purpose processors (such as digital signal processing chips, graphics acceleration processors, and/or the like); one or more input devices 515, which can include without limitation a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire, and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A system comprising:
   one or more memories storing computer-readable instructions thereon; and
   one or more processors associated with a tokenization system that execute the computer-readable instructions to:
   perform a connection procedure to connect to a terminal device acting as a point of sale (POS) device, the connection procedure comprising:
   receiving a connection request from the terminal device;
   in response to receiving the connection request, verifying that the terminal device is enabled and authenticated;
   upon verifying that the terminal device is enabled and authenticated, checking whether at least one of a software or hardware update is needed for the terminal device for operability with the tokenization system; and
   upon confirming that no updates to the terminal device are needed or upon updating the terminal device if the updates are needed, sending a connect response to the terminal device;
   upon completing the connection procedure, request payment information from the terminal device;
   receive the payment information from the terminal device;
   request a token for the payment information from one or more other processors associated with a tokenization gateway upon receiving the payment information; and
   send the token to the terminal device for use instead of the payment information.

2. The system of claim 1, wherein the connection request comprises an authentication key, and wherein the one or more processors further execute computer-readable instructions to authenticate the terminal device based on the authentication key before receiving the payment information from the terminal device.

3. The system of claim 1, wherein the connection request comprises an identifier of the terminal device, and wherein the one or more processors further execute computer-readable instructions to verify that the identifier received in the connection request matches a stored identifier for the terminal device before receiving the payment information from the terminal device.

4. The system of claim 3, wherein the identifier comprises a hardware serial number of the terminal device.

5. The system of claim 1, wherein in response to receiving the connection request, the one or more processors further execute computer-readable instructions to:
   transmit a file check command to the terminal device to request additional information from the terminal device;

receive a file check response from the terminal device in response to transmitting the file check command, wherein the file check response comprises a check sum of the software running on the terminal device; and verify that the check sum of the software received in the file check response matches a stored check sum for the software before receiving the payment information from the terminal device.

6. The system of claim 5, wherein the file check response further comprises a version of firmware currently running on the terminal device, and wherein the one or more processors further execute computer-readable instructions to verify that the version of firmware received in the file check response matches a stored firmware version for the terminal device before receiving the payment information from the terminal device.

7. The system of claim 1, wherein the payment information that is received from the terminal device is encrypted payment information, wherein the request for the token comprises the encrypted payment information, and wherein the one or more processors further execute computer-readable instructions to:

receive the token that is generated by the tokenization gateway upon decrypting the encrypted payment information for sending to the terminal device.

8. The system of claim 1, wherein to check for the at least one of software or hardware updates for the terminal device, the one or more processors further execute computer-readable instructions to:

check whether an upgrade to the software installed on the terminal device is available;

upon determining that the upgrade is available, transmit the upgrade to the terminal device;

receive a first response from the terminal device accepting the upgrade; and receive a second response from the terminal device confirming the installation of the upgrade.

9. The system of claim 1, wherein to check for the at least one of software or hardware updates for the terminal device, the one or more processors further execute computer-readable instructions to:

determine current style properties on the terminal device; and send a command to the terminal device to update the current style properties upon determining that updates to the current style properties are needed.

10. The system of claim 1, wherein the one or more processors execute further computer-readable instructions to:

receive, from the terminal device, an indication that the terminal device is requesting additional functionality; and communicate, based on receiving the indication, a command to the terminal device to enable the additional functionality.

11. A non-transitory computer-readable media comprising computer-readable instructions stored thereon that when executed by one or more processors associated with a tokenization system cause the one or more processors to:

perform a connection procedure to connect to a terminal device acting as a point of sale (POS) device, the connection procedure comprising:

receiving a connection request from the terminal device;

in response to receiving the connection request, verify that the terminal device is enabled and authenticated;

upon verifying that the terminal device is enabled and authenticated, check whether at least one of a software or hardware update is needed for the terminal device for operability with the tokenization system; and upon confirming that no updates to the terminal device are needed or upon updating the terminal device if the updates are needed, sending a connect response to the terminal device;

upon completing the connection procedure, request payment information from the terminal device;

receive the payment information from the terminal device;

request a token for the payment information from one or more other processors associated with a tokenization gateway upon receiving the payment information; and send the token to the terminal device for use instead of the payment information.

12. The non-transitory computer-readable media of claim 11, wherein the connection request comprises an authentication key, and wherein the one or more processors further execute computer-readable instructions to authenticate the terminal device based on the authentication key before receiving the payment information from the terminal device.

13. The non-transitory computer-readable media of claim 11, wherein the connection request comprises an identifier of the terminal device, and wherein the one or more processors further execute computer-readable instructions to verify that the identifier received in the connection request matches a stored identifier for the terminal device before receiving the payment information from the terminal device.

14. The non-transitory computer-readable media of claim 13, wherein the identifier comprises a hardware serial number of the terminal device.

15. The non-transitory computer-readable media of claim 11, wherein in response to receiving the connection request, the one or more processors further execute computer-readable instructions to:

transmit a file check command to the terminal device to request additional information from the terminal device;

receive a file check response from the terminal device in response to transmitting the file check command, wherein the file check response comprises a check sum of the software running on the terminal device; and verify that the check sum of the software received in the file check response matches a stored check sum for the software before receiving the payment information from the terminal device.

16. The non-transitory computer-readable media of claim 15, wherein the file check response further comprises a version of firmware currently running on the terminal device, and wherein the one or more processors further execute computer-readable instructions to verify that the version of firmware received in the file check response matches a stored firmware version for the terminal device before receiving the payment information from the terminal device.

17. The non-transitory computer-readable media of claim 11, wherein the payment information that is received from the terminal device is encrypted payment information, wherein the request for the token comprises the encrypted payment information, and wherein the one or more processors further execute computer-readable instructions to:

receive the token that is generated by the tokenization gateway upon decrypting the encrypted payment information for sending to the terminal device.

18. The non-transitory computer-readable media of claim 11, wherein to check for the at least one of software or hardware updates for the terminal device, the one or more processors further execute computer-readable instructions to:
  check whether an upgrade to the software installed on the terminal device is available;
  upon determining that the upgrade is available, transmit the upgrade to the terminal device;
  receive a first response from the terminal device accepting the upgrade; and
  receive a second response from the terminal device confirming the installation of the upgrade.

19. The non-transitory computer-readable media of claim 11, wherein to check for the at least one of software or hardware updates for the terminal device, the one or more processors further execute computer-readable instructions to:
  determine current style properties on the terminal device; and
  send a command to the terminal device to update the current style properties upon determining that updates to the current style properties are needed.

20. The non-transitory computer-readable media of claim 11, wherein the one or more processors execute further computer-readable instructions to:
  receive, from the terminal device, an indication that the terminal device is requesting additional functionality; and
  communicate, based on receiving the indication, a command to the terminal device to enable the additional functionality.

* * * * *